United States Patent

[11] 3,616,260

[72] Inventor Hans Müller, Erlenbach, Zurich, Switzerland
[21] Appl. No. 801,095
[22] Filed Feb. 20, 1969
[45] Patented Oct. 26, 1971
[73] Assignee Process Engineering Company, S.A. Mannedorf, Zurich, Switzerland

[54] FERMENTATION PROCESS AND APPARATUS
6 Claims, 1 Drawing Fig.
[52] U.S. Cl. ..................................... 195/107, 55/178, 195/134
[51] Int. Cl. ..................................... C12b 1/18
[50] Field of Search .......................... 195/107, 134; 55/178, 87; 252/361

[56] References Cited
UNITED STATES PATENTS
2,564,765 8/1951 Mercier ..................... 55/178

Primary Examiner—Lionel M. Shapiro
Assistant Examiner—J. M. Hunter
Attorney—Michael S. Striker ABSTRACT: In a fermentation process substances are fermented in a container under simultaneous agitation with attendant formation of foam. The foam is separated into its liquid and gaseous phases and the gaseous phase is exhausted. A flowable medium is introduced into the container and into the region wherein foam forms, in counterflow to the exhausting gaseous phase, to thereby prevent the development of mycelium growths which could lead to interruption of the foam formation and separation.

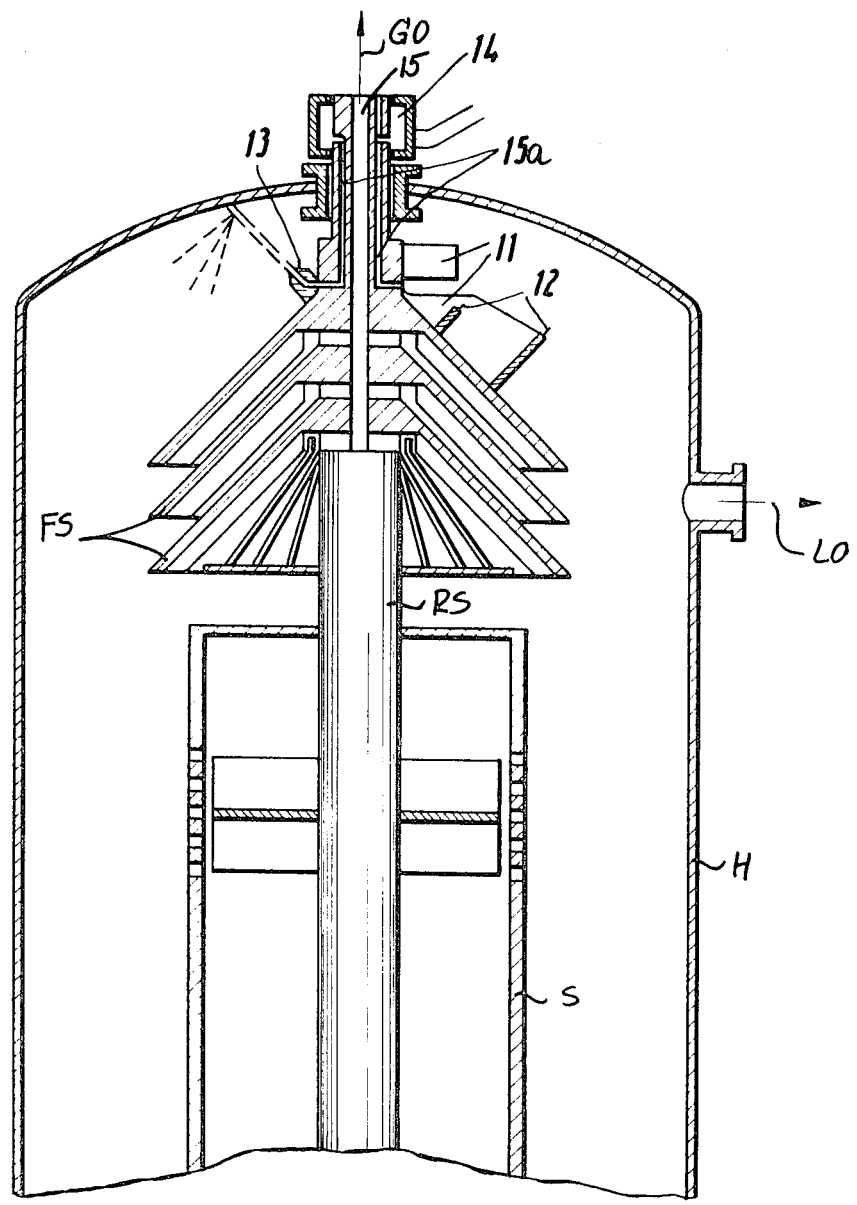

FERMENTATION PROCESS AND APPARATUS

BACKGROUND OF THE INVENTION

The present invention relates generally to fermentation of substances, and more particularly to the separation of foams which develop during fermentation processes into their gaseous and liquid phases. Still more particularly the invention relates to a method of preventing disruptions of such separation and to an apparatus for carrying out the method.

It is known to carry out fermentation processes under conditions of constant agitation which results in the formation of foam in the fermentation container. To exhaust the large quantities of gas added for the fermentation process but not used up, together with the gaseous reaction products, foam separators are provided which continuously separate the forming foam into its liquid and gaseous components with the latter being exhausted.

This approach has been found very advantageous except in one circumstance, namely where fermentation processes are concerned which involve organisms having strong and rapid mycelium growth. This occurs, for instance, in the manufacture of antibiotics and the development of such growths may lead to disruption in the foam separation by clogging of the foam separator.

SUMMARY OF THE INVENTION

It is, accordingly, a general object of the invention to overcome this disadvantage.

More particularly it is an object of the present invention to provide a method of avoiding the development of such mycelium growths.

An additional object of the invention is to provide an apparatus for carrying out the method.

In pursuance of the above objects, and others which will become apparent hereafter, one feature of my invention resides, in a fermentation process of the type under discussion, in separating the foam into its liquid and gaseous phases with a rotary foam-separating instrumentality, exhausting the gaseous phase from the container via the instrumentality, and advancing a flowable medium along the rotary foam-separating instrumentality in counterflow to the gaseous phase to thereby prevent the development of mycelium growth on and in the vicinity of the foam-separating instrumentality.

The purposes of the present invention can be accomplished in a most simple manner and without requiring the addition of complicated equipment by introducing, continuously or from time to time, a flowable medium such as a gas, steam or a liquid through the outlet passage for the gas to be exhausted but in counterflow thereto. The outlet passage is advantageously provided in a hollow shaft of the rotary foam-separating instrumentality and the flowable medium is advantageously at elevated temperature to thereby obtain not only dislodging of mycelium growths but also sterilization of the apparatus. The flowable medium may be intermittently squirted into the container wherein the fermentation takes place, rather than admitted continuously, but this further enhances the cleaning effect to more reliably prevent mycelium growths or to dislodge them.

If a liquid is used as the flowable medium, then it may be admitted continuously through the outflowing exhaust gases. It is advantageous if the flowable medium constitutes the substrate which in any case must be continuously admitted.

I wish to emphasize that while resort to my novel method and apparatus reliably prevents mycelium growths on and in the vicinity of the foam-separating instrumentality, that is in areas where it could cause difficulties and disrupt the continuous separation of the foam into its gaseous and liquid phases, the development of mycelium growths on the inner walls of the container in which the fermentation process takes place—and which is desirable—is not thereby adversely affected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates an apparatus according to the present invention in fragmentary longitudinal section.

DESCRIPTION OF THE PREFERRED EMBODIMENTS

Discussing now the FIGURE in detail, which illustrates by way of example a single apparatus capable of carrying out the method according to my invention, it will be seen that I have illustrated a well-known fermentation container or housing H in whose interior there is located a shield S within which a rotary shaft RS is mounted for rotation about its axis. The shaft RS carries within the confines of the shield S a plurality of radially projecting blades of which one is shown and which are not identified with reference numerals because they are well known and are of no importance for the purposes of the present invention. The housing H is upright and has an outlet LO for liquid phase and an outlet GO for gaseous phase. At the upper end projecting beyond the shield S the rotary shaft RS carries a conventional foam-separating instrumentality FS, here illustrated as a plurality of conical members which are mounted on the shaft RS for rotation therewith. In response to rotation of the shaft RF and of the foam separator FS foam forming in the region of the foam separator, that is in the upper part of the housing H, is separated in well-known manner into its gaseous and liquid phases, and the gaseous phase is exhausted through a central passage 15 which is provided in the upper end portion of the shaft RS and which communicates in known manner with the hollows below the respective conical members constituting the foam separator FS.

In accordance with my invention I may provide one at least, namely in the illustrated embodiment the uppermost of the conical members constituting the foam separator FS, with individual projections or annular circumferentially complete or incomplete projections 12 extending at a right or an obtuse angle from the upper side of the respective conical member, as illustrated at the right-hand side of the single FIGURE. Additionally I provide one or more radially extending vanes 11 on the shaft RS projecting therefrom, as also shown in the right-hand side of the drawing. The foam surrounding the foam separator FS in the regions of the elements 11 and 12 will, when the foam separator FS is rapidly rotated, be flung against the inner wall of the housing H.

This is of some assistance in overcoming the problem; however, because the foam is of fine consistency, that is, has small bubbles and is soft and readily yieldable, it does not have sufficient kinetic energy to reliably remove strongly growing mycelium. I therefore provide a passage 15a which communicates on the one hand with an annular space 14 exteriorly of the housing H and on the other hand with the interior of the housing. Suitable sealing means is provided for sealing the point of penetration of the end portion of the shaft RS through the housing H, and they are shown diagrammatically but not illustrated in detail because they are of no consequence for the purposes of the present invention and are in any case well known to those skilled in the art.

A flowable medium, such as a gas, steam or liquid and which may be a substrate, is introduced through the annular space or chamber 14 into the passage 15a and issues from there into the region of the elements 11 and 12 in counterflow to the gas being exhausted through the other bore 15. I wish it to be understood that this arrangement can be replaced by providing a tube concentric with the bore 15, if desired.

The incoming flowable medium is flung by the elements 11 and 12 against the inner side of the housing top or cover, that is the upper portion of the housing H, and removes mycelium growths from the region of the foam separator FS, thereby precluding interference of such growths with the continued separation of foam in this region into its gaseous and liquid phases.

Simultaneously with the elements 11 and 12 shown in the right-hand side of the FIGURE, or in lieu of them, I may provide at the inner exit of the bore 15a, that is the exit communicating with the interior of the housing H, nozzles 13 which direct the incoming flowable medium against the inner or underside of the housing cover and therefore also achieve the purpose of the present invention, namely to dislodge by their impact mycelium growths in this region. Such a stream is indicated in broken lines in the left-hand side of the FIGURE by way of example. It will be understood that there may be a plurality of such nozzles 13 circumferentially spaced.

Resort to no novel method and the apparatus for carrying out the method permits me to overcome this heretofore rather objectionable problem in a simple and most reliable manner without requiring complicated and expensive reconstructions or additions of conventional apparatus used for the purposes at hand.

It will be understood that each of the elements described above, or two or more together, may also find a useful application in other types of constructions differing from the types described above.

While the invention has been illustrated and described as embodied in an apparatus for carrying out fermentation processes, it is not intended to be limited to the details shown, since various modifications and structural changes may be made without departing in any way from the spirit of the present invention.

I claim:

1. In a fermentation process, wherein substances are fermented in a container and under agitation with attendant formation of foam, the steps of separating the foam into its liquid and gaseous phases with a rotary foam-separating instrumentality having exposed surfaces; exhausting the gaseous phase from the container via the instrumentality; and advancing a flowable medium along and in contact with the exposed surfaces of said rotary foam-separating instrumentality in counterflow to the gaseous phase, to thereby prevent the development of mycelium growths on said instrumentality and consequent clogging of the same.

2. In a fermentation process as defined in claim 1, wherein said flowable medium is advanced intermittently.

3. In a fermentation process as defined in claim 1, wherein said flowable medium is advanced intermittently and in squirts.

4. In a fermentation process as defined in claim 1, wherein said flowable medium is of a character suitable as a substrate in the fermentation process.

5. In a fermentation apparatus wherein the fermentation of substances in a container and under agitation results in the formation of foam and in mycelium growth, a combination comprising rotary foam separator means in the container and operative for separating the foam into its liquid and gaseous phases and for exhausting the gaseous phase from the container, said foam separator means comprising a hollow rotary shaft communicating with the interior and exterior of said container, and foam-separating elements carried on said shaft; and port means in said shaft for admitting a flowable medium into said container for flowing advancement over said foam separator means in counterflow to said gaseous phase to thereby prevent the development of mycelium growths on said rotary foam separator means.

6. In an apparatus as defined in claim 5, said separating elements including a plurality of axially spaced conical members mounted on and surrounding said hollow shaft; and further comprising guide means provided on at least one of said members and operative for directing the flowing medium against proximal areas of the container wall to thereby effect the prevention of mycelium growth thereon.